US008069446B2

(12) United States Patent
Zhao et al.

(10) Patent No.: US 8,069,446 B2
(45) Date of Patent: Nov. 29, 2011

(54) PARALLEL PROGRAMMING AND EXECUTION SYSTEMS AND TECHNIQUES

(75) Inventors: Weidong Zhao, Bellevue, WA (US); Yegnaswamy R. Sermadevi, Mountain View, CA (US); Cheng Chang, Redmond, WA (US); Eric S. Christoffersen, Beaux Arts, WA (US)

(73) Assignee: Microsoft Corporation, Redmond, WA (US)

( * ) Notice: Subject to any disclaimer, the term of this patent is extended or adjusted under 35 U.S.C. 154(b) by 417 days.

(21) Appl. No.: 12/418,452

(22) Filed: Apr. 3, 2009

(65) Prior Publication Data

US 2010/0257538 A1 Oct. 7, 2010

(51) Int. Cl.
G06F 9/50 (2006.01)
G06F 9/46 (2006.01)

(52) U.S. Cl. ............... 718/104; 718/102; 718/105

(58) Field of Classification Search .......... 718/102, 718/105, 104
See application file for complete search history.

(56) References Cited

U.S. PATENT DOCUMENTS

| 7,073,175 | B2 | 7/2006 | Rehg et al. |
|---|---|---|---|
| 2005/0262510 | A1 | 11/2005 | Parameswaran et al. |
| 2006/0056513 | A1 | 3/2006 | Shen et al. |
| 2006/0059484 | A1 | 3/2006 | Selvaggi et al. |
| 2006/0215754 | A1 | 9/2006 | Buxton et al. |
| 2007/0204318 | A1 | 8/2007 | Ganesh et al. |
| 2007/0220525 | A1 | 9/2007 | State et al. |
| 2008/0187053 | A1 | 8/2008 | Zhao et al. |
| 2008/0219349 | A1 | 9/2008 | Huang et al. |
| 2009/0007127 | A1 | 1/2009 | Roberts et al. |

OTHER PUBLICATIONS

"International Search Report", Mailed Date: Oct. 29, 2010, Application No. PCT/US2010/028922, Filed Date: Mar. 26, 2010, pp. 8.
Kim, et al., "Multithread Video Coding Processor for the Videophone", Retrieved at <<http://citeseerx.ist.psu.edu/viewdoc/download;jsessionid=93B13CE7756BC782C28FFD653845582D?doi=10.1.1.33.8822&rep=repl&type=pdf>>, pp. 11.
Roitzsch, Michael, "Slice-Balancing H.264 Video Encoding for Improved Scalability of Multicore Decoding", Retrieved at <<http://os.inf.tu-dresden.de/papers_ps/roitzsch06balanced.pdf>>, pp. 4.
Hardwidge, Ben, "Badaboom GPGPU Video Encoder Released", Retrieved at <<http://www.custompc.co.uk/news/605085/badaboom-gpgpu-video-encoder-released.html#>>, Oct. 24, 2008, pp. 4.
Amit, et al., "Scalability of Multimedia Applications on Next-Generation Processors", Retrieved at <<http://www.cs.tau.ac.il/~gamit/papers/ICME_06_Amit.pdf>>, pp. 4.

*Primary Examiner* — Aimee Li
(74) *Attorney, Agent, or Firm* — Mayer & Williams PC

(57) ABSTRACT

Parallel programming and execution systems and techniques are discussed herein. In accordance with one technique, a parallel programming model is used to decompose a complex process into parallelizable tasks with proper dependencies set by data objects as interfaces. Another technique features a scheduling mechanism that provides thread affinity and automatic load-balance management among an assortment of processing units such as CPUs/CPU cores, GPUs/GPU cores, and/or hardware threads in a scalable manner. The models and techniques are applied in an exemplary manner to a digital media encoding process.

20 Claims, 8 Drawing Sheets

PARALLEL PROGRAMMING AND EXECUTION SYSTEMS AND TECHNIQUES

BACKGROUND

Traditional computing environments featuring single processors generally perform data processing operations associated with a particular computer-implemented process in a serial manner, although some traditional computing environments may support time-division multiplexing, where a single processor switches between different operations frequently enough that a user perceives that the operations are being performed concurrently.

Computing environments have been trending to multiprocessing systems having multiple processing units. Many types of systems may be considered to be multiprocessing systems, and examples of multiprocessing systems include but are not limited to: systems having multiple central processing units ("CPUs") and/or graphics processing units ("GPUs"); single- or multi-CPU/GPU systems having multiple cores; and single- or multi-CPC/GPU systems that have additional hardware supports to efficiently execute multiple operations Computer programs that implement all or part of a particular computer-implemented process may also be designed to be multithreaded, that is, to have multiple threads of execution. A thread of execution is a portion of a computer program that can be performed concurrently with another portion of the computer program.

The trend toward multiprocessing systems and the emergence of multithreaded computer programs, and especially the combination thereof, has the potential to increase performance and efficiency of many computer-implemented processes. To achieve such performance and efficiency gains, it is desirable to specially design multithreaded computer programs.

SUMMARY

A parallel programming authoring and execution system is described herein, which provides models and techniques to address various challenges of designing a multithreaded computer program that performs at least a part of a particular computer-implemented process, in a single- or multi-processing unit computing environment. The term processing unit is used herein to refer to any CPU, GPU, core, hardware thread, or other processing construct known or later developed. The term thread is used herein to refer to any software or processing unit or arrangement thereof that is configured to support the concurrent execution of multiple operations.

In accordance with aspects of one exemplary technique implemented by the system described herein, a complex process is represented by relating a number of data processing operations of the process to the data dependencies between the data processing operations. An executable task graph is created based on the process representation. The task graph includes a number of task objects and a number of data objects. Each task object represents a particular corresponding computer-implemented function that performs (via hardware, software, firmware, or a combination thereof) a particular data processing operation. Each data object represents a portion of a memory allocated for storing data based on at least one data dependency.

In general, a particular task object has one or more data object inputs and one or more data object outputs. Likewise, a particular data object has at least one "owning" task object (and may in fact be limited to only one owning task) from which available data is receivable, and has at least one "dependent" task object to which available data is suppliable, except when the data object is the final output data item, to which usually a different interface mechanism may be employed. A particular data object also has a number of states that are set.

During execution of the task graph, a particular computer-implemented function that performs a particular data processing operation becomes ready to execute when all of the data object inputs associated with its corresponding task object have states that indicate that data is available for use. The execution of the task graph continues as states of the data object inputs and data object outputs associated with each task object are updated, triggering execution of the computer-implemented methods that perform corresponding data processing operations, until the desired output data of the process has been obtained.

In accordance with aspects of another exemplary technique implemented by the system described herein, computer-implemented functions/data processing operations are scheduled for execution according to certain scheduling rules. In general, computer-implemented functions/data processing operations are scheduled for execution by placing work items associated with their corresponding task objects into one or more queues. The work items have priorities based on the task objects (in one example, a priority is determined at the time of creation of a task object.) Based on the priorities, an available thread, which is operating independently and concurrently in conjunction with other threads, fetches a work item and causes execution of the computer-implemented function that performs the data processing operation.

In one exemplary scheduling scenario, a group of threads is bound to a processing unit (for example, a group of cores, or a particular GPU) and locally shares a primary queue and the same cache in a cache/memory hierarchy. When a particular work item is placed on a particular primary queue, a linked copy of the work item is also placed on each of the other queues associated with the other groups/processing units (referred to as "secondary" queues), with each work item having a different relative priority (relative, for example, to the original priority of the associated task object). Generally, a work item in a primary queue has a higher priority than the same work item in one or more secondary queues, allowing the work items in the secondary queues to serve as "bailout" in case the group of threads of the primary queue gets too behind. Once a work item is performed, it is removed from both the primary and secondary queues. In this manner, scheduling is flexible and readily configures for desired load balancing and/or thread affinity requirements, at both the intra- and inter-processing unit levels.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this document.

DETAILED DESCRIPTION

The parallel programming authoring and execution system ("PPAES") and techniques discussed herein facilitate performance of a computer-implemented process in a variety of computing environments, such as multiprocessing computing environments. An executable task graph based on a process representation is created and used to decompose the process into parallelizable tasks with proper dependencies set by data objects as interfaces. Scheduling techniques provide thread affinity and/or automatic load-balance management, during execution of the task graph, among an assortment of processing units such as CPU cores and GPU units in a scalable manner.

The techniques are applied in an exemplary manner to a digital media encoding process. Although media processing activities are discussed for exemplary purposes, it will be appreciated that the techniques discussed herein may be applied to any process that can be decomposed into a number of relatively predictable functions.

Figure 1:
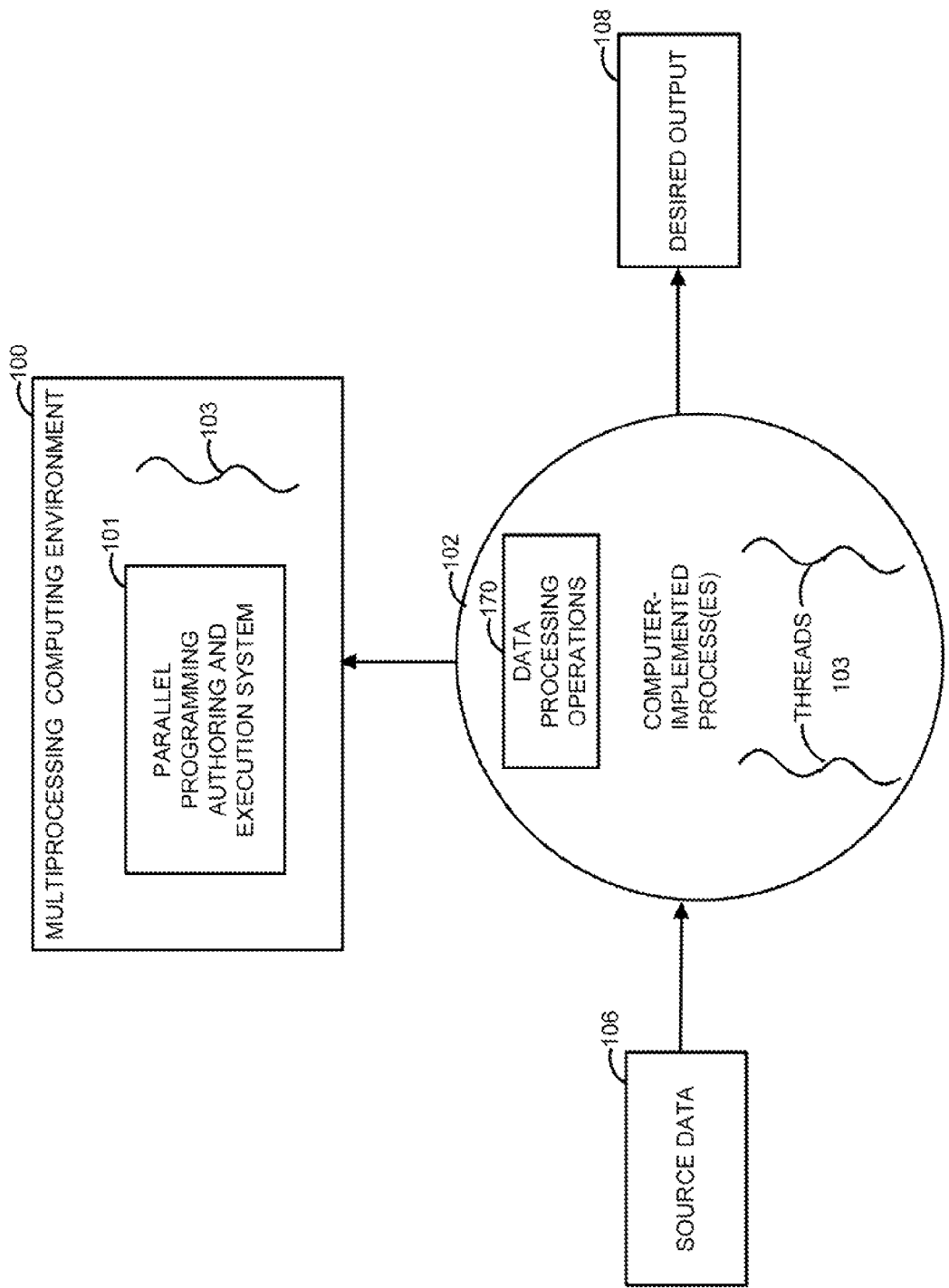
FIG. 1 is a simplified functional block diagram of an exemplary multiprocessing computing environment with which a Parallel Programming Authoring and Execution System ("PPAES") may be implemented or used to facilitate performance of a particular computer-implemented process.

Turning to the drawings, where like numerals designate like components, FIG. 1 is a simplified functional block diagram of certain aspects of a multiprocessing computing environment 100. Environment 100 includes PPAES, which may be implemented or used to facilitate performance of a particular computer-implemented process 102 via creating and execution of a task graph and/or components thereof (task graph 300 is discussed below, in connection with FIG. 3) and implementation of certain scheduling techniques (scheduling techniques are discussed below, in connection with FIGS. 5 and 7).

Process 102 transforms certain source data 106 to produce desired output 108. In an exemplary implementation, process 102 is a digital media encoding process, although it will be appreciated that process 102 may be any process that can be decomposed into a number of relatively predictable functions. As shown, process 102 includes data processing operations 170, which are executed via threads 103. Data processing operations 170 represent any operations executable via hardware, software, firmware, or any combination thereof, either internal or external to environment 100. The term thread is used herein to refer to any software thread or processing unit or arrangement thereof that is configured to support the concurrent execution of multiple operations, for example, to fetch and/or trigger execution of computer-implemented functions that perform data processing operations 170. A software thread is a thread of execution of a computer program—a portion of the computer program that can be performed concurrently with another portion of the computer program. A processing unit refers to any central processing unit ("CPU"), graphics processing unit ("GPU"), any core of any CPU or GPU, any hardware thread, or any other processing construct now known or later developed.

Figure 2:
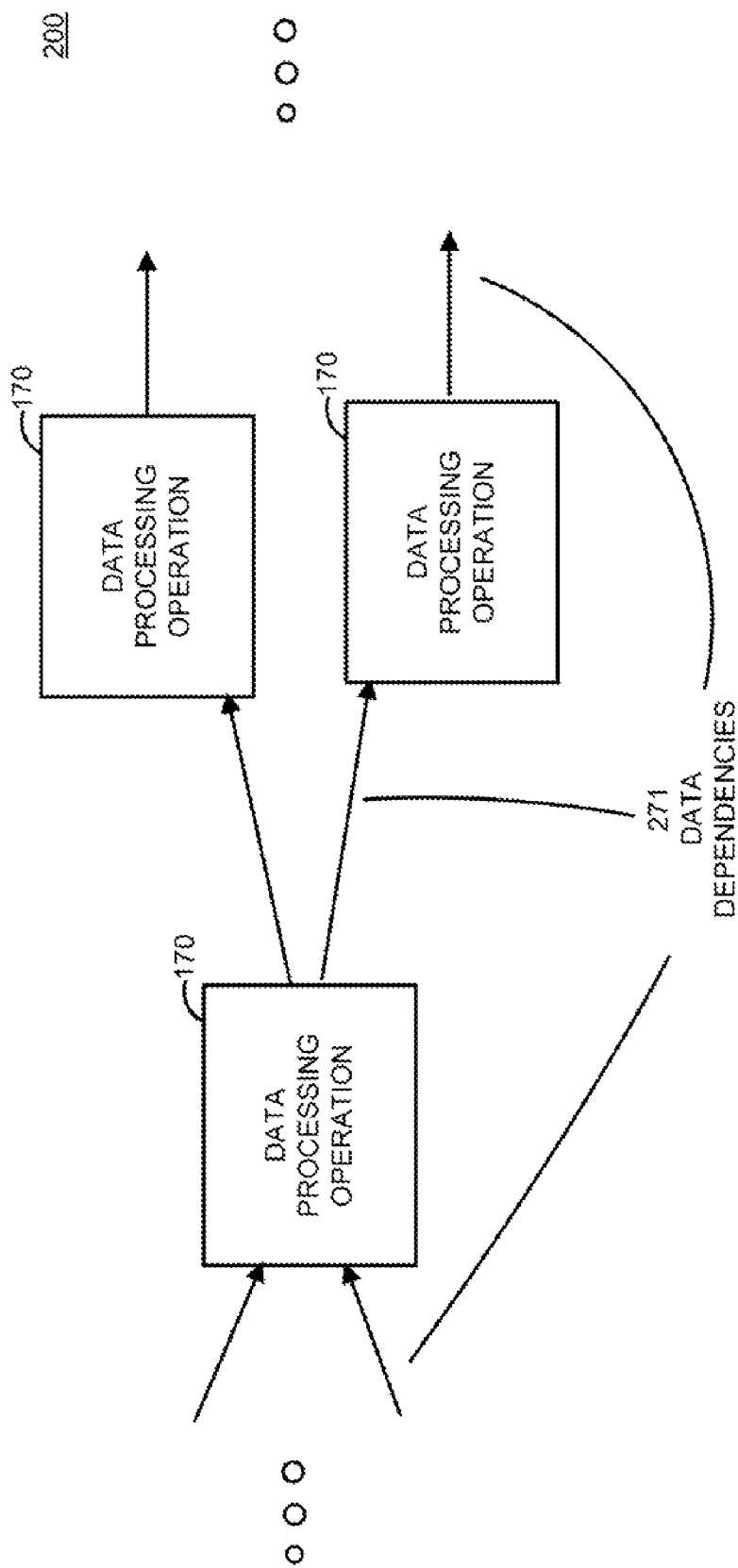
FIG. 2 is an exemplary partial process representation of the process shown in FIG. 1.

With continuing reference to FIG. 1, FIG. 2 is a partial, exemplary process representation 200 of process 102, which relates data processing operations 170 and data dependencies 271. As shown, representation 200 is in the form of a data flow graph, which is a graphical representation of the various data processing operations 170 performed in connection with process 102, and the data dependencies linkages 271 therebetween (arrows into and/or out of the data processing operations) that represent data flowing into or out of the data processing operations. Although process representation 200 is shown as a data flow graph, process representation may be formed in any known or later developed manner by relating the data processing operations and the data dependencies, and may be in any desired form.

Figure 3:
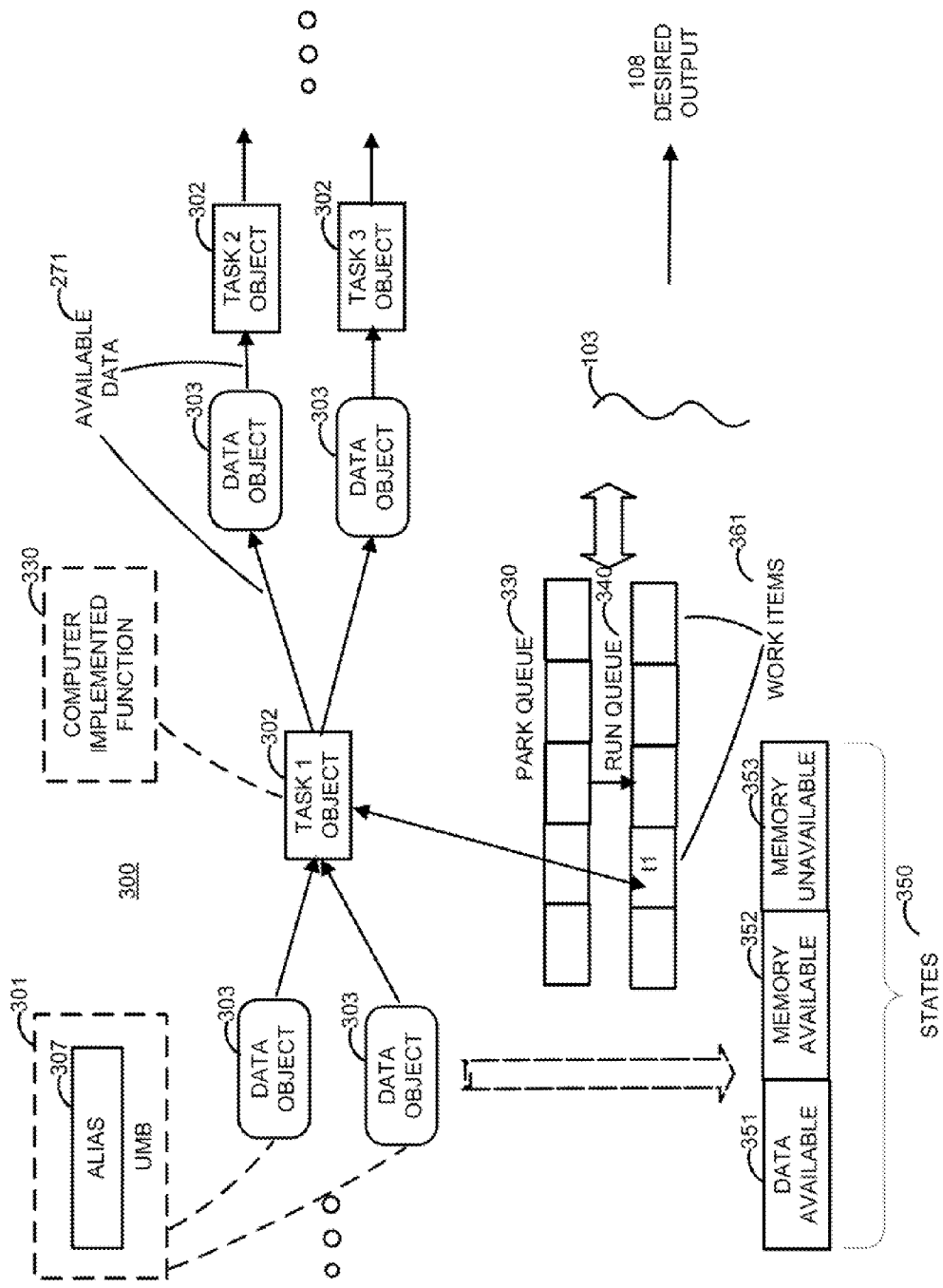
FIG. 3 is an exemplary partial task graph generated based the process representation shown in FIG. 2.

With continuing reference to FIGS. 1 and 2, FIG. 3 is an exemplary, partial task graph 300 based on process representation 200 shown in FIG. 2. Generally, task graph 300 is generated pursuant to one or more aspects of PPAES 101 (discussed further below, in connection with FIG. 5), and is implemented by one or more sets of computer-executable instructions which, when executed by a computing system having one or more processors, facilitates performance of process 102 represented by process representation 200. As such, in one possible implementation, task graph 300 illustrates a number of runtime objects with their links. The clear and natural boundaries of responsibility provided by the task graph promote object-oriented design.

As shown, task graph 300 includes a number of task objects 302 and a number of data objects 303 (data objects 303 are illustrated with rounded edges). Available data 371 is shown moving through task graph 300. It should be noted that the task object numbering scheme shown in FIG. 3 does not necessarily imply a certain sequence of execution, and that available data 371 flowing into or out of a particular data object 303 and/or task object 302 may mean different things in different processes. For example, a diverging flow can mean that duplicate copies of available data are being sent, or a complex set of data is being split into more elementary data items, or that items having different values are being separated. A converging flow can indicate that several elementary data items are joined together to form a more complex set of data, or that input data from different sources are operated upon. It should also be noted that there may not be a one-to-one ratio between available data 371 input to a particular task object and/or data object, and available data 371 output from a particular task object and/or data object.

As related to process representation 200, each task object 302 represents a particular corresponding (generally, asynchronous) computer-implemented function 330 that performs a particular data processing operation 170. A particular computer-implemented function 330 may be performed by hardware, software, firmware, or any combination thereof, internal or external to the computing system responsible for executing task graph 300. In one possible implementation, a particular task object is an interface to a computer program that is configured to cause performance of the corresponding computer-implemented function based on information provided via the task object. Certain tasks, referred to as "source tasks" (not shown) can spawn other task graphs, and source tasks are also responsible for managing long-term data objects (discussed further below), as the source tasks know whether or not a long-term data object is needed for future service.

As related to executable task graph 300, task objects 302 may be created and/or managed by a task manager engine (not shown), such as a service, as part of PPAES 101. Each task object 302 represents an operation that acts on its input data objects and produces a result in its output data objects. A particular task object 302 may have one or more data objects 303 as inputs, and one or more data objects 303 as outputs. A task object is generally created (from the heap) when a particular task graph 300 is generated, lives on the task graph, and is deleted after the corresponding computer-implemented function 330 has completed performance of its particular data processing operation 170 (or, in the case of source tasks, after the sub-task graph has been generated). As such, a task object 302 has a lifetime (not shown) that expires (deleting of task objects is discussed further below, in connection with an exemplary "thread operation loop.")

Figure 4:
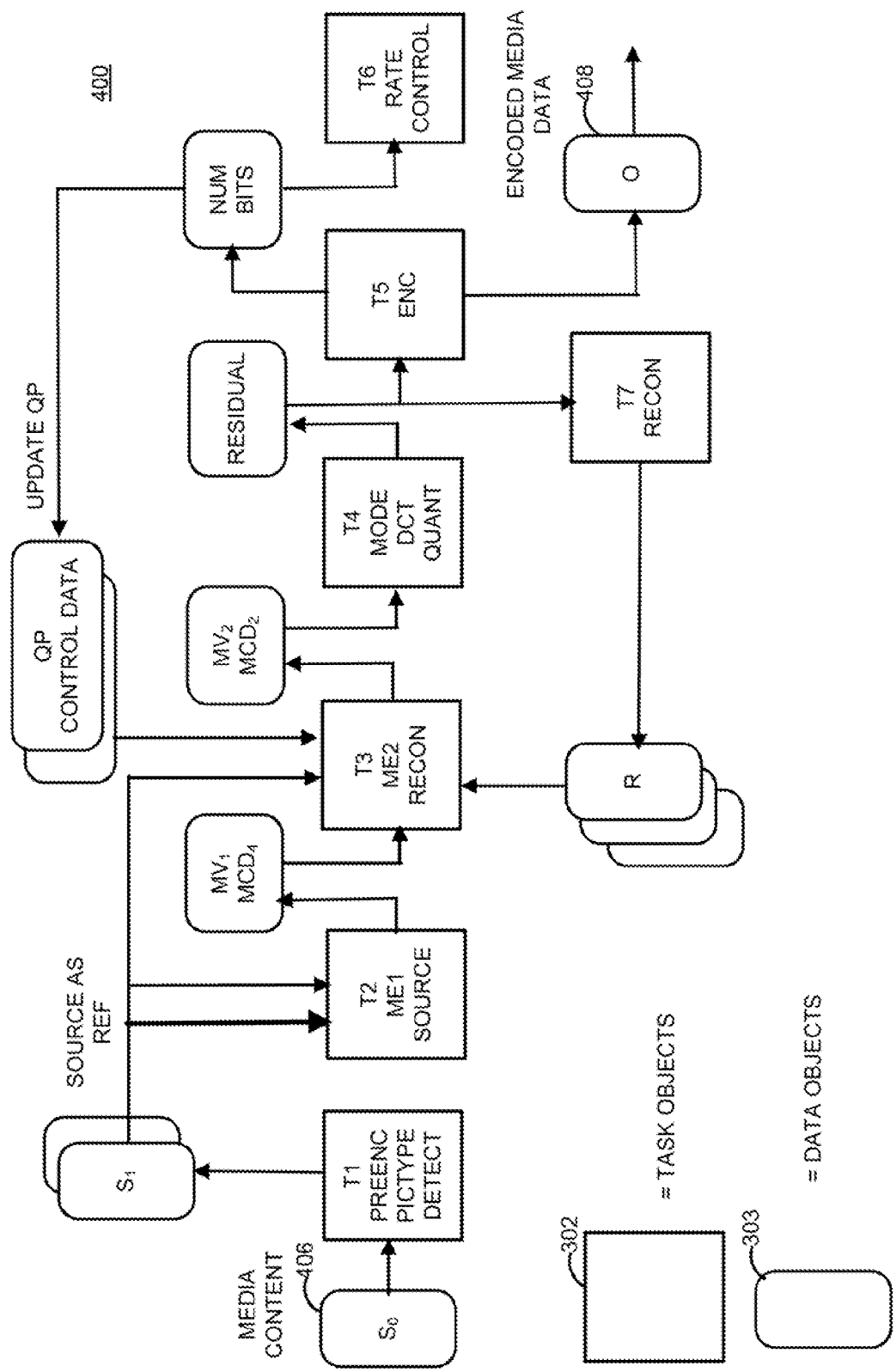
FIG. 4 is an exemplary task graph generated in connection with performing an exemplary one-pass video encoding process.
Figure 8:
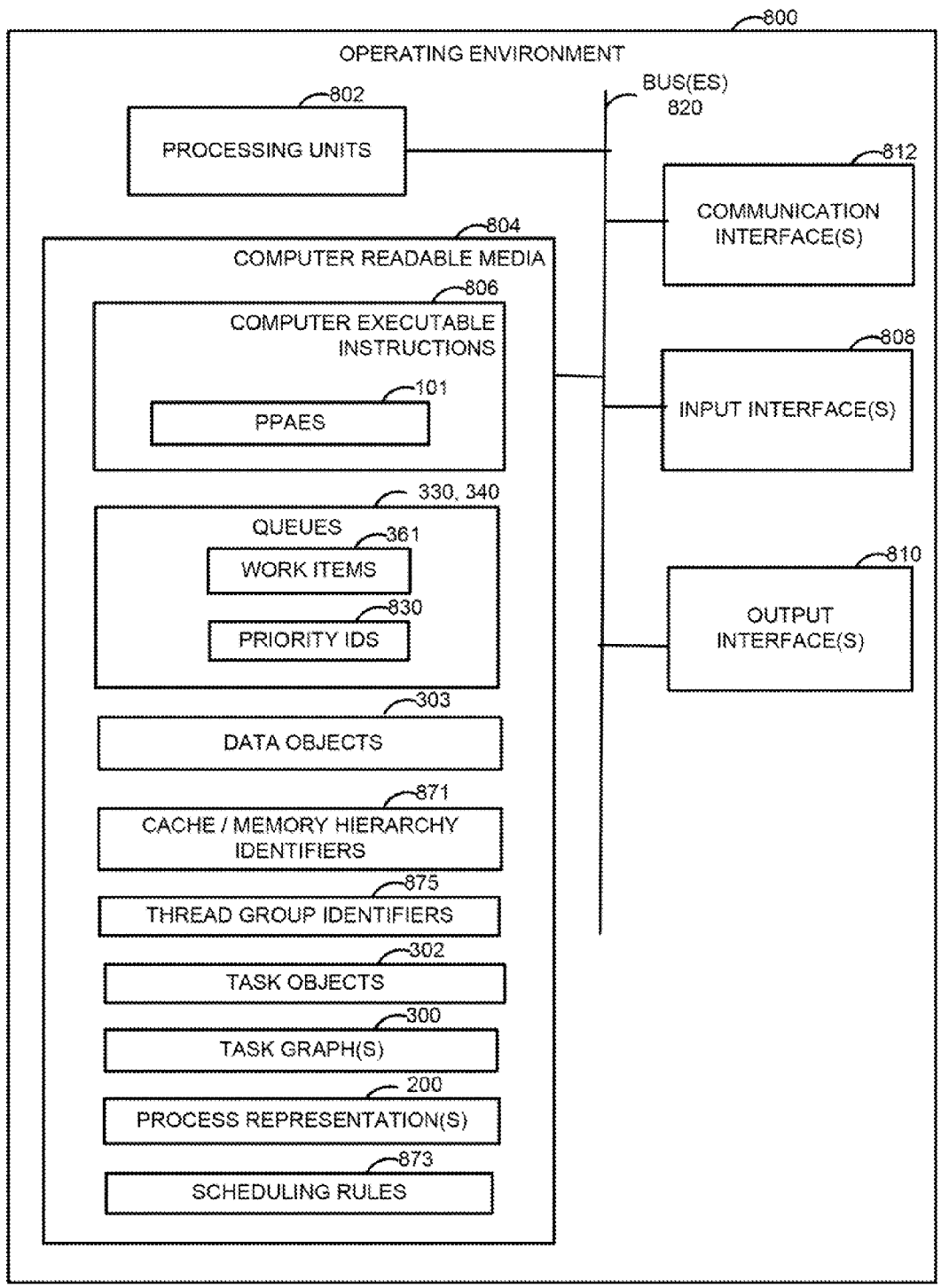
FIG. 8 is a simplified functional block diagram of an exemplary operating environment in which aspects of the PPAES and the multiprocessing computing environment shown in FIG. 1, and/or the methods shown in FIGS. 6 and 7, may be implemented or used.

When a task object is created, it has a priority identifier ("priority id") assigned thereto (priority ids 830 are shown in FIG. 8). Generally, a priority id has a scope that spans the entirety of source data 106 operated on by process 102 (for example, as discussed below in connection with FIG. 4, source data 106 may be media content composed of a sequence of media samples), to ensure proper prioritization of tasks between multiple task graphs executed in connection with performance of the process. It will be appreciated that task object priority ids may be running, relative priorities, relative to production of desired output, performance feedback, or other factors.

The following pseudo-code defines an exemplary task object schema, where "DB" refers to "data object":

data dependency 271. One UMB may be associated with multiple data blocks at a time, using aliases 207, and may maintain an "alias count" representing the number of data blocks aliasing to the particular UMB (when the alias count reaches zero, the UMB may be deleted, that is, become available for use for another purpose). Aliasing can be useful when a particular task object has input data blocks and output data blocks aliasing to the same UMB, when in-place operation is preferred, or in the case of segmentation, where multiple segments are sharing the same UMB. Segmentation may be used to divide the underlying UMB into smaller segments for finer granular tasking. Generally, a data object is created on the heap and lives on the task graph, with the exception of long-term data objects, which may additionally live on global arrays of pointers to the long-term data objects.

A particular data object 303 has at least one (and it may be desirable to have only one) "owning" task object from which available data 371 is receivable, and at least one "dependent" task object to which available data 371 is suppliable, (except when it is one of the final output object, in which case a different interface mechanism may be employed). An owning task may own more than one data object, for example, a short-term data object and a long-term data object. Generally, a particular data object maintains a list of task objects having the data object as an input. Available data 371 flowing into a particular data object 303 may be described as new information being placed into a particular UMB 201, which may be in addition to or as a replacement or modification of all or part of the existing information within the UMB.

Each data object has a number of states 350. Three exemplary states are defined as follows, although it will be appreciated that more, fewer, or different states are possible: a memory unavailable state 351, indicating that the portion of the memory represented by a particular data object 303 is not ready to receive available data 371 from an owning task

```
Base Class for Task:
enum DBStatus { MU, MA,DA}
class Task{
    //When both m_iNumUnavailInputDB and m_iNumUnavailOutputDB == 0,
the task goto ReadyQ
    // When m_iNumUnavailInputDB ==0 and and m_iNumUnavailOutputDB
!= 0, the task goto memWQ
Int m_iNumUnavailInputDB;    //The number of inputs with DBStatus != DA //a
task object becomes ready for execution if all its input_DBs are in the DA state; a
ready task object may not be immediately runnable depending on other resources
required to become runnable, such as the memory requirement for the output_DBs to
become memory available state from memory unavailable state. A ready but not
runnable work item/task object is placed into the park queue in priority order; it later
becomes runnable when the resource required becomes available to it as a result of
release from another object.
Int m_iNumUnavailOutputDB;    //The number of Outputs with DBStatus == MU
Int64 m_iSchedulePriority;    // determines sequence-scope priority used by the
scheduling rules/task operations manager
Int m_iThreadGroup; //determines which thread group this Task should be bounded
Input_DB_list; Output_DB_list; //a list of all input data objects; a list of all output
data objects
virtual Execute( ); //the Execute( ) virtual function is expected to be overridden by a
derived class to implement a specific computer-implemented function/data processing
operation. Execute( ) uses Input_DB_list as inputs, and Output_DB_list as outputs
}
```

Referring again to FIG. 3, data objects 303 may be created and/or managed by a data object manager engine (not shown), such as a service, as part of PPAES 101. Each data object 303 represents a portion of a memory—an "underlying memory block" ("UMB") 201, which may be identified by an alias 207—that is allocated for storing data based on at least one object; a memory available state 352, indicating that the portion of the memory represented by a particular data object 303 is ready to receive available data 371 from an owning task object; and a data available state 353, indicating that available data 371 has been received from an owning task object and is ready to be supplied to a dependent task object.

Data objects are created and deleted by a service, which may be a service similar to a heap manager. A data object has a lifetime (not shown) that expires when certain conditions are met. Generally, a data object is created with a certain size and with a state of memory unavailable, at the time of set-up of a task graph. The memory unavailable state blocks the owning task from running until the state is changed to memory available. A task graph may be created when its owning task object is ready for execution, and deleted when its associated overlying data objects have served their purposes (including possible long-term purposes). At deletion time, the UMB associated with the data object is freed. In one scenario, one or more other data blocks in need of memory resources may be identified and the freed memory allocated thereto, by changing the states of those one or more data objects to memory available states.

A data block may maintain a record (referred to for exemplary purposes as a "purpose counter") of the number of purposes it needs to serve before expiring (e.g., being deleted). As a purpose is served, the purpose counter is decremented. A long-term data object may have a link to an array or other data structure having global scope. The connection to the global scope data structure (which may be made when the task graph is set up and removed by the same setup of a later task graph after determining that a particular data object has finished serving as a long-term data object) serves as one count in the purpose counter for the particular data object.

The following pseudo-code defines an exemplary data object schema, where "DB" refers to "data object":

```
Base Class for DataObject:
Class UMB{
Void * m_pData; Int iSize;
Int m_iAliasCount;    //holds the alias count in the physical memory
}
class DataObject {
DBStatus m_eDBStatus;
Int m_iRefCount; // ref_count = the number of edges in and
out of this DB
Dependent_task_list;
Task * m_pOwningTask;
UMB * m_pUMB;
}
```

Referring again to FIG. 3, once all task objects 302 and data objects 303 for a particular task graph 300 have been instantiated at runtime, the task graph is executed to produce desired output 108. Specifically, when a computer-implemented function (that performs a particular data processing operation 170) represented by a corresponding task object 302 is deemed to be ready to be performed, a work item 361 associated with the task object (depicted as work item "T1" associated with task object 1) is placed on one or more queues 330, 340 (discussed further below) according to the priority of the task object, and fetched by an available thread 103. The fetching of the work item by the available thread 103 results in the execution, by the fetching thread, of a computer program (to which the task object may be an interface) that is configured to cause performance of the computer-implemented function that performs the data processing operation. The following is a description, in pseudo-code form, of an exemplary thread operation loop, which may be implemented and/or managed by a thread execution engine as part of PPAES 101:

```
Get next work item
Execute the work item by calling the Execute( ) routine referred to in
the task object
After the work item is completed, cleanup the task object
    For each input data object, decrement its purpose count, and delete it
    when the purpose count reaches zero
    For each output data object
        Decrement its purpose count (note the purpose count cannot be
        zero if there are other task objects with it as an input data
        object)
        Mark its state as data available to unblock other task objects
        depending on it
    For each task object with this data object as an input data
    object, create a work item to be placed into a queue (according
    to scheduling rules) when it has become ready as a result of the
    state change of this data object
Delete the task object
```

Although the technique of cleaning up the task object described in the exemplary thread operation loop above does not specifically reference the task graph itself, the operation of removing a completed task object and its associated data objects does achieve the effect of gradually tearing down the task graph.

In one exemplary implementation, when each of the input data objects associated with the corresponding task object is in the data available state 353, a computer-implemented function is deemed to be ready to be performed and a work item 361 is associated with the corresponding task object is created. The work item is checked against the available global resources (e.g., memory) of the computing environment in which it will be executed.

When the available resources are deemed to be less than what are required to place all of the output data objects associated with the task object into particular states (for example, to place the output data object state(s) from memory unavailable to memory available), the work item is placed onto park queue 330 according to the priority of the task object. Work items on the park queue may be moved to run queue 340 when the output data objects are all in the memory available state, or when other desired conditions are achieved. Generally, resources such as memory become available as a result of other, unrelated objects releasing memory, but available memory may also be increased because of some external factor. As resources become available, they may be given to work items on the park queue based on the priority ids of their associated task objects.

When the available resources are deemed to be adequate, the UMB(s) for the task object's output data objects are committed, the states of the output data objects are changed from memory unavailable to memory available (and appropriate global resource levels are updated), and the work item is placed onto run queue 340 according to the priority id of the task object, where it is fetched by an available thread 103.

With continuing reference to FIGS. 1-3, FIG. 4 is an exemplary executable task graph 400 usable in connection with performing an exemplary one-pass video encoding process for a particular set of samples (for example, a frame) of a particular input sequence of media content 406, to produce encoded media content 408. As shown, task objects 302 (seven shown) have pointed edges, and data objects 303 have rounded edges.

$S_0$ represents raw media content (for example, a sequence of media samples, such as video frames). The encoding process is composed of several data processing operations, or data processing stages, with each stage having an associated task object: pre-encoding/detection stage, task object T1; a motion estimation stage, task object T2, which searches against the previous source frame(s) to identify and eliminate temporal redundancies that exist between individual pictures; a motion estimation refinement stage, task object T3, which searches against the previously reconstructed frame(s) to perform refinement to the result from the T2 stage; a mode decision/quantization stage, task object T4; a loop filter and reconstruction stage, task object T7; an entropy coding stage, task object T5, where residuals are encoded to produce encoded media data 408 in the form of a bit stream; and a rate control stage, task object T6. S1 is a buffer for storing the result of the pre-encoding and picture type detection task. MVn and MCDn are the motion vector and motion compensated distortion, respectively, after the stage n motion estimation.

There are generally at least two source tasks in an encoding scenario: one at the frame entry point for the purpose of frame type discovery, and the other right after the frame type discovery for constructing a frame-specific task graph. A setup routine for the main task graph is executed as a source task for each frame, right after the picture type discovery in the pre-encoding stage (a pre-encoding task may be decomposed into a fixed sub-task graph). Based on the picture type discovered, the task objects and data objects for encoding of the picture are created, and the main task graph for the picture is set up. Within a frame, the task object priority ids generally decrease from input towards output (and at a frame-level, the anchor frames should have higher priority than subsequent B frames). A new task graph is instantiated by hooking it up with the existing (long-term) data objects from the global data object arrays, and work items for any task objects ready to run are placed on the appropriate queues. Gradually, the task graphs are torn down by the per-thread cleanup routine, performed after each work item/task object has been executed. At runtime, a number of partially "dissolved" task graphs will generally co-exist, achieving inter-frame parallelism.

Long-term data objects can cross the durations of multiple encoded pictures. A connection to a long-term data object may be made at the setup of a task graph, and removed by the same setup of a later picture after determining that the data object has finished serving as a long-term data object, thus downgrading it to a short-term data object.

An exemplary (for example, default) assignment of a priority id to a particular task object is as follows: m_iSchedulePriority=m_t*MaxNumOfTasksInASample+iStageInASample, where m_t is the sample (e.g., frame) index at the sequence level; and iStageInASample indicates the relative stage within the sample for the current work/item/task object. This formula ensures that work items/task objects from earlier samples take higher priority than those from the later samples, and for within the same sample, the work items/task objects of earlier stages take higher priority than those from the later stages. This formula also allows arbitrary customization.

With continuing reference to FIGS. 1-4, FIG. 5 is a simplified functional block diagram of one possible implementation of an exemplary multiprocessing computing environment, such as environment 100 and/or 900 (shown in FIG. 8) in which the task graphs described herein, such as task graphs 300 and 400, may be executed. Based on the scheduling mechanisms and techniques described below, it is possible to address the issues of load balancing and thread affinity in a scalable manner, and enable a particular multithreaded computer program to be readily adapted to different computing environments, including many-core CPU and GPGPU. Generally speaking, thread affinity and load balancing are on two extremes of the scale. On the one hand, thread affinity, which binds a thread to a particular processing unit and thus promotes data traffic locality, could cause poor load-balancing if the loads on multiple threads are unevenly distributed at runtime. On the other hand, complete load balance can be achieved by disallowing thread affinity and disregarding locality. Such practice, while minimizing idle processing unit cycles, can cause data traffic pollution in a multiprocessing architecture, when workloads are heavily re-allocated across a cache/memory hierarchy.

Figure 5:
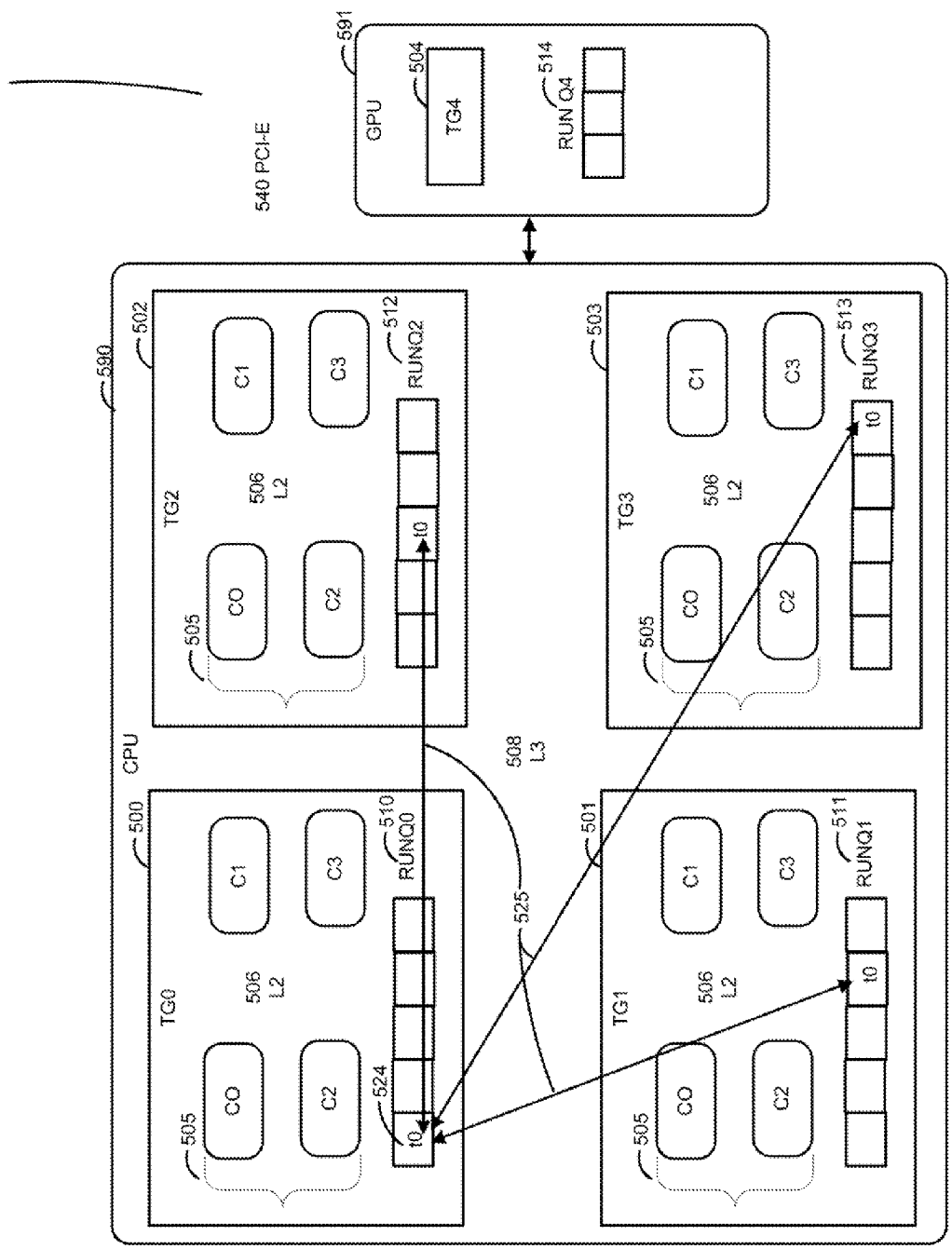
FIG. 5 is a simplified functional block diagram of one possible implementation of the exemplary multiprocessing computing environment shown in FIG. 1.

The concept of a thread group ("TG") presented herein helps to address the thread affinity/load balancing dilemma present in multiprocessing computing environments and/or execution of multithreaded computer programs. As shown in FIG. 5, a particular group of threads (a "TG") is bound to a particular processing unit sharing the same local L1/L2/L3, etc. cache in a cache/memory hierarchy nomenclature often used to describe modern many-core architectures. Five groups are shown, TG0 500, TG1 501, TG2 502, TG3 503, and TG4 504. As shown, thread groups TG0, TG1, TG2, and TG3 are bound to a hypothetical CPU 590 of 4×4 cores 505 (C0, C1, C2, and C3), and thread group TG4 is bound to GPU 591. A particular processing unit is generally in the same cache/memory hierarchy. For example, set of cores 505 is in the L2 506 cache/memory hierarchy, while the entire CPU 590 shares an L3 cache/memory hierarchy 508. GPU generally accesses a separate cache/memory hierarchy (not shown). Each TG accesses (and in the case of multiple processing units, shares) a primary run queue (referred to in FIG. 5 as a "runQ"). As shown, TG0 accesses runQ0 510, TG1 accesses runQ1 511, TG2 accesses runQ2 512, TG3 accesses runQ3 513, and TG4 accesses runQ4 514. Within a TG, there is generally no affinity, and each thread has an equal right to fetch the highest priority work item from its primary runQ, therefore reaching essentially total load balancing within the TG. The fact that the TG is built on the same local L1/L2/L3 cache also essentially eliminates the issue of data traffic pollution because of load balancing, and instead promotes the highly efficient usage of the local cache.

In the scenario of inter-TG work item scheduling, in the case where workloads among the TGs are not evenly distributed, soft load balancing/affinity techniques may be applied on the TG basis. That is, the total hardware threads are divided into a number of TGs based on a desired L1/L2/L3, etc. cache locality in the overall cache/memory hierarchy, as described above. The associated software threads may be further divided and assigned to each TG. Each TG also has a runQ, as described above, from which the threads within the group can fetch work items to execute. When a particular task object (not shown) becomes runnable, it is put onto the primary run queue associated with its TG as a work item (as shown, work item T0 524), based on the original task priority id assignment. Additionally, linked copies of the work item for the task object (designated by arrows 525) are put onto the primary run queues of other TGs, with reduced relative priorities (relative, for example, to the original priority id of the task object). The primary run queues of the other TGs are thus treated as secondary run queues, which can serve as "bailout" in case the primary TG becomes too behind. The relative priority reduction amounts are generally unevenly assigned among the secondary TGs. It will be appreciated that original task object priority ids and reduced relative priorities may be running, relative priorities, relative to production of desired output, what is already in a particular queue, traffic information, performance feedback, or other factors. When any copy of a particular work item is fetched by any thread of any TG, all of the linked copies of the work item may be removed from all of the runQs in which such copies appeared.

The reduced relative priorities copies of work items in secondary run queues ensure that when load balance of the entire system is healthy, the thread(s) of the TG associated with the primary run queue will have the highest chance to fetch a particular work item. When the system load balance is such that the primary TG is running too behind, a secondary TG with a relatively lighter load will have a higher chance to fetch the work item. Linking copies of the work items helps to ensure the integrity of this scheme.

It can be seen that this framework can be extended to include a modern GPGPU, so that GPU/CPU inter-group load balancing is possible. In fact, since the connections between GPU 591 and CPU 590 through PCI-e bus 540 are generally much slower than system memory, a dedicated TG may be assigned for each GPU device to exploit the parallelism between PCI-e and GPUs. Generally, the ratio of the number of GPU threads to GPUs can be more than one, to fully exploit the GPU/PCE-e parallelism. Since GPGPU operations may involve copying of data between system memory and video memory, there are some changes that may be desirable in both data objects and task objects—for example, the data object class may include a pointer to the GPU memory, in addition to a pointer in the system memory, and the task object may have different versions of execute( ) for the CPU and the GPU. For consecutive task objects running on GPU 591 (e.g., TG4 504), where the intermediate stages do not rely on data copied back to CPU 590, it is possible to skip those memory copies, along with the system memory allocation for that purpose. Of course, when inter-group load balancing between TG4 504 and the other thread groups kicks off, those skipped memory copies will generally have to be performed again, with some latency possible.

Figure 6:
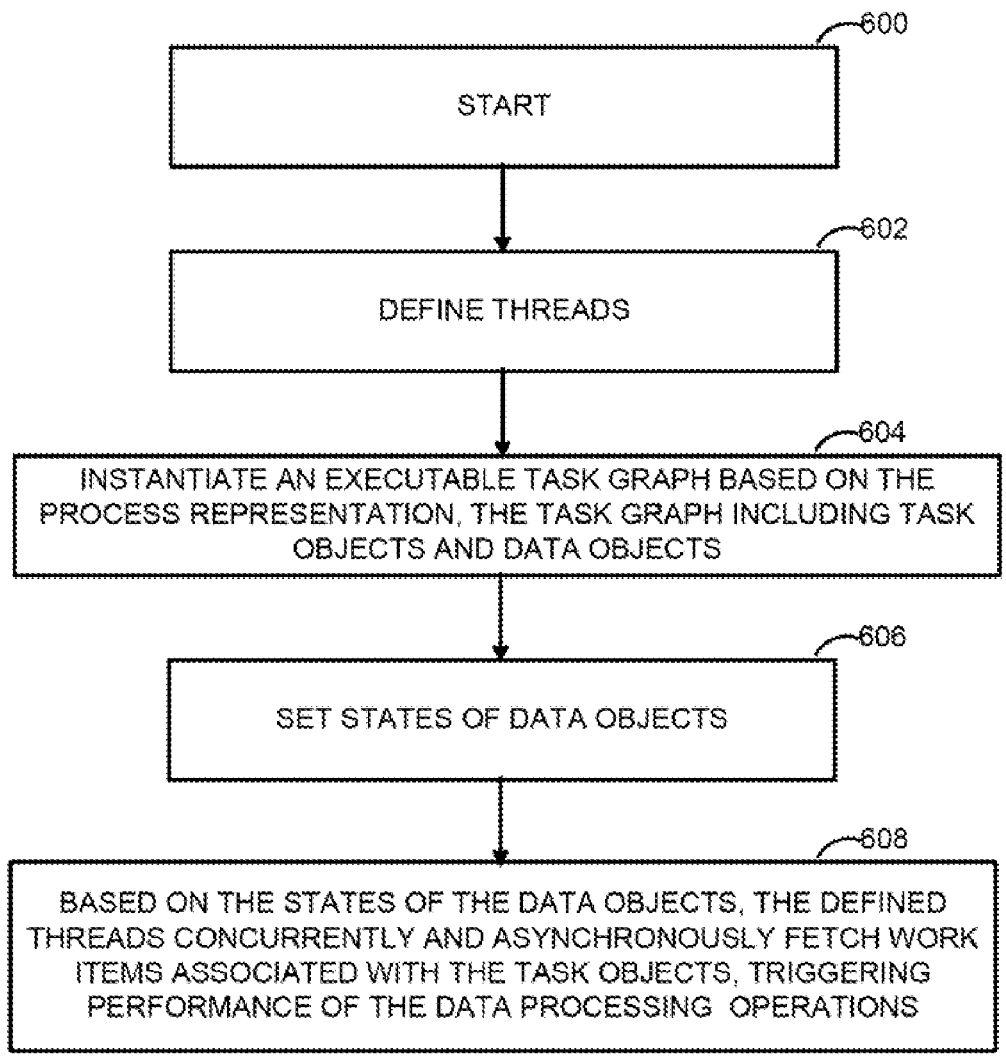
FIG. 6 is a flowchart of one exemplary method for using aspects of the PPAES shown in FIG. 1 to perform a computer-implemented process.
Figure 7:
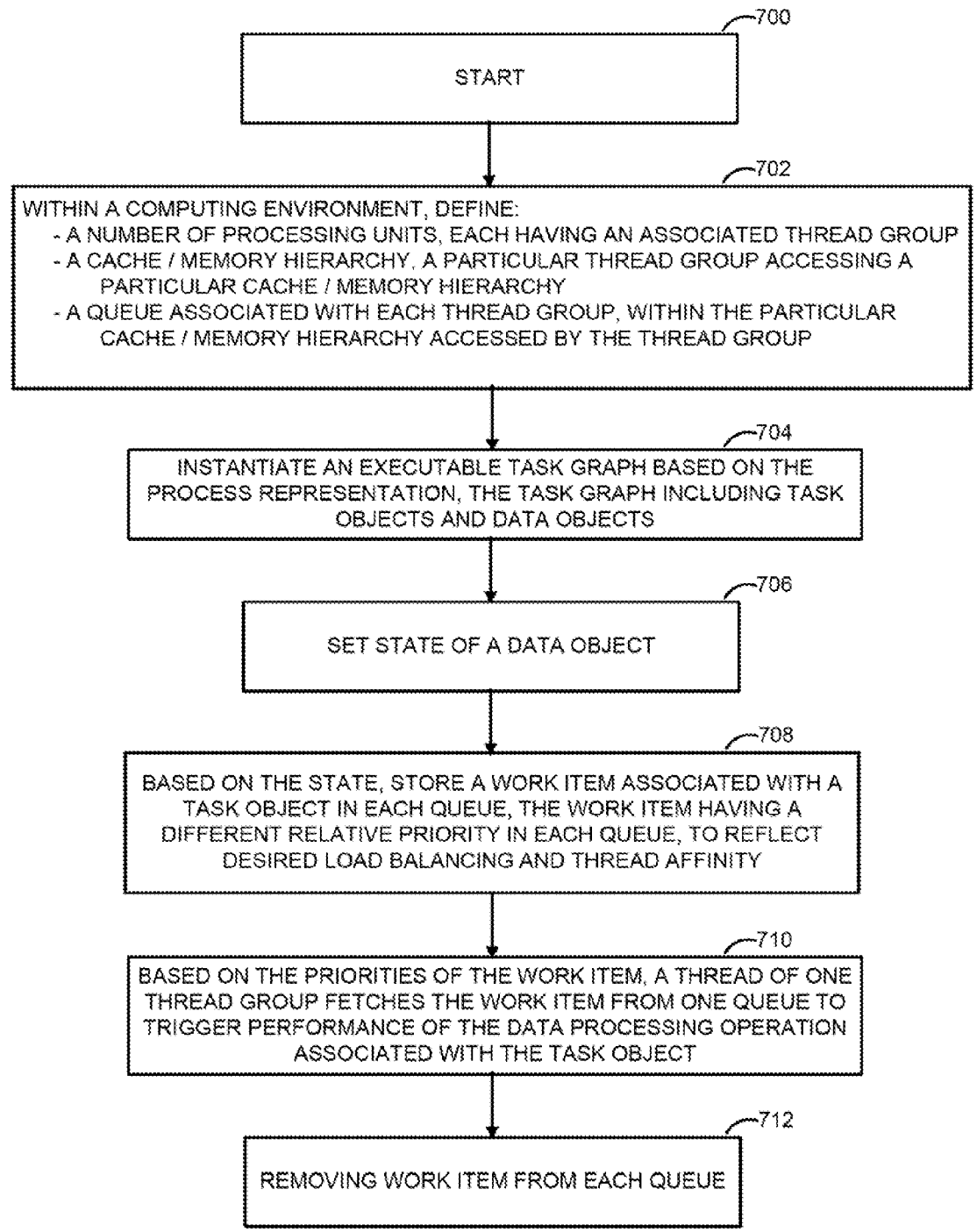
FIG. 7 is a flowchart of another exemplary method for using aspects of the PPAES shown in FIG. 1 to perform a computer-implemented process.

With continuing reference to FIGS. 1-5, FIGS. 6 and 7 are flowcharts of methods using the systems and techniques described herein for performing a process, such as process 102, to produce desired output data, such as desired output data 108, which process includes data processing operations, such as data processing operations 170, and data dependencies therebetween, such as data dependencies 271, and is represented by a process representation such as process representation 200. The method shown in FIG. 6 is useful to create and execute a task graph based on the process representation. The method shown in FIG. 7 is useful in connection with scheduling performance of data processing operations of the process within the computing system executing the task graph, to achieve desired thread affinity and/or load balancing.

The processes illustrated in FIGS. 6 and 7 may be implemented in one or more general, multi-purpose, or single-purpose processors or processing units. Unless specifically stated, the methods described herein are not constrained to a particular order or sequence. In addition, some of the described methods or elements thereof can occur or be performed concurrently.

Referring to the method shown in the flowchart of FIG. 6, the method begins at block 600 and continues at block 602, where one or more threads, such as threads 103, are defined. Next, at block 604, an executable task graph, such as task graph 300 or 400, is instantiated and executed. The task graph includes task objects, such as task objects 302, and data objects, such as data objects 303. One or more states of the data objects are set, as indicated at block 606. At block 608, based on the one or more states of the data objects, the defined threads concurrently and asynchronously fetch work items associated with the task objects, triggering performance of the data processing operations.

Referring to the method shown in the flowchart of FIG. 7, the method begins at block 700 and continues at block 702, where within a computing environment are defined: a number of processing units, such as processing units 590 and 591 (or, more generally, processing units 902, shown in FIG. 8); a number of thread groups ("TGs"), such as TGs 500, 501, 502, 503, and 504), each TG associated with a particular processing unit; a cache/memory hierarchy, a particular TG accessing a particular cache/memory hierarchy; and a queue associated with each TG, such as runQs 510, 511, 512, 513, and 514. At block 704, an executable task graph, such as task graphs 300, is instantiated based on the process representation. The task graph includes task objects, such as task objects 302, and data objects, such as data objects 303. A state of a particular data object is set, as indicated at block 706, such as a data available state 351. Based on the state, at block 708, a work item associated with a task object, such as work item T1 361 or T0 524, is stored in each queue. The work item has a different relative priority in each queue, such as a reduced priority relative to the original priority id generated upon creation of the task object, to reflect a desired load balancing and/or thread affinity of the overall system. As indicated at block 710, based on the relative priorities of the work item, the work item is fetched from one queue by one TG, to trigger performance of the data processing operation. At block 712, the work item is removed from each queue after it is fetched by the TG.

Thus, it can be seen that the system and techniques discussed herein efficiently and in a scalable manner provide for, among other things: the often complex coordination and runtime overhead of software threads and/or processing units that may be necessitated by the need to share data therebetween; management of traffic and/or distance constraints resulting from sharing such data via system buses and/or memory; balancing/scheduling of processing operations evenly across threads; and the ability of a particular multithreaded computer program to be readily adapted to different computing environments.

With continuing reference to FIGS. 1-7, FIG. 8 is a simplified block diagram of an exemplary operating environment 800 in which aspects of the PPAES, the multiprocessing computing environment(s), and/or the methods discussed herein may be implemented or used. Operating environment 800 is only one example of a suitable operating environment and is not intended to suggest any limitation as to the scope of use or functionality of the system(s) and methods described herein. For example, operating environment 800 may be a type of computer, such as a personal computer, a workstation, a server, a portable device, a laptop, a tablet, or any other type of electronic device, such as a mobile phone, a personal digital assistant, a media player device; a set-top box device; a digital recording device; an in-vehicle device, or any hardware, software, or firmware aspect of the foregoing. Operating environment 800 may also be a distributed computing network or a service, for example.

One or more communication media 820, such as buses, may be used to carry data, addresses, messages, control signals, and other information within, to, or from operating environment 800 and/or elements thereof. One or more processing units is/responsive to computer-readable media 804 and to computer-executable instructions 506. Processing units 802, which may be real or virtual processors, control functions of an electronic device by executing computer-executable instructions. Processing units 802 may execute instructions at the assembly, compiled, or machine-level to perform a particular process. Such instructions may be created using source code or any other known computer program design tool.

Computer-readable media 804 represent any number and combination of local or remote devices, in any form, now known or later developed, capable of recording, storing, or transmitting computer-readable data, such as the instructions executable by processing units 802. In particular, computer-readable media 804 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. Computer-readable media 504 may also include transmission media and data associated therewith. Examples of transmission media/data include, but are not limited to, data embodied in any form of wireline or wireless transmission, such as packetized or non-packetized data carried by a modulated carrier signal.

Computer-executable instructions 806 represent any signal processing methods or stored instructions that electronically control predetermined operations on data. In general, computer-executable instructions 806 are computer programs implemented as software components according to well-known practices for component-based software development, and encoded in computer-readable media (such as computer-readable media 804). Computer programs may be combined or distributed in various ways. As shown, PPAES 101, which may further include (not shown) a task graph creation and/or execution engine, is responsible for creating and executing task graphs (including creating and deleting task objects and data objects), work item/queue and/or scheduling management, and managing thread loop operation. In connection with operation of PPAES 101, computer-readable storage media may store items such as process representations 200, task graphs 300, data objects 303, task objects 302, queues 330 and 340, work items 361, priorities identifiers 830, thread group identifiers 875, cache/memory hierarchy identifiers 871, and scheduling rules 873.

Functions/components described in the context of operating environment 800/computing environment 100 are not limited to implementation by any specific embodiments of computer programs. Rather, functions are processes that convey or transform data, and may generally be implemented by, or executed in, hardware, software, firmware, or any combination thereof, located at, or accessed by, any combination of functional elements.

Input interface(s) 808 provide input to operating environment 800. Input may be collected using any type of now known or later-developed interface, such as a user interface. Examples of input interfaces include but are not limited to remote controls, displays, mice, pens, styluses, trackballs, keyboards, microphones, scanning devices, and all types of devices that are used input data.

Output interface(s) 810 provide output from operating environment 800. Examples of output interface(s) 810 include but are not limited to displays, printers, speakers, drives, and the like.

Communication interface(s) 812 are available to enhance the ability of operating environment 800 to receive information from, or to transmit information to, another entity via a communication medium such as a channel signal, a data signal, or a computer-readable medium. Communication interface(s) 812 may be, or may include, elements such as cable modems, data terminal equipment, media players, data storage devices, personal digital assistants, or any other device or component/combination thereof, along with associated network support devices and/or software or interfaces.

Various aspects of a parallel programming authoring and execution system and multiprocessing computing environment therefore have been described. It will be understood, however, that all of the described aspects of the PPAES or computing environment need not be used, nor must the aspects, when used, be present concurrently. Functions/components described herein as being computer programs are not limited to implementation by any specific embodiments of computer programs. Rather, functions are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A computer-readable storage medium encoded with computer-executable instructions, which, when executed, perform a method for performing a process to produce desired output data, the process comprising
    a first data processing operation,
    a second data processing operation,
    at least one data dependency between the first and second data processing operations, and
    a process representation formed by relating the first data processing operation and the second data processing operation based on at least one data dependency,
    the method comprising:
    defining a first thread comprising a first portion of the computer-executable instructions, the first thread operable to execute computer programs for performing the first and second data processing operations;
    defining a second thread comprising a second portion of the computer-executable instructions, the second thread operable to execute, asynchronously and concurrently with the first thread, the computer programs for performing the first and second data processing operations;

at runtime of the computer-executable instructions, instantiating an executable task graph based on the process representation, the task graph comprising
- a first task object representing a first computer implemented method configured to perform the first data processing operation,
- a second task object representing a second computer implemented method configured to perform the second data processing operation, and
- a data object, the data object representing a portion of a memory allocated for storing available data based on the at least one data dependency, the data object having a number of states for facilitating communication between the first task object and the second task object;

setting a first state of the data object;

based on the first state, via the first task object, triggering execution of the first computer implemented method by the first thread or the second thread to output available data to the memory via the data object;

after available data has been output to the memory, setting a second state of the data object; and based on the second state, via the second task object, triggering execution of the second computer implemented method by the first thread or the second thread to transform the available data.

2. The computer-readable storage medium according to claim 1, wherein the process comprises an encoding process for media content comprising a sequence of media samples, the sequence comprising a number of sets of media samples, and wherein the desired output data comprises encoded media data, and wherein an executable task graph is instantiated for each set of media samples.

3. The computer-readable storage medium according to claim 1, the method further comprising:
repeatedly performing the steps of setting the first state of the data object, triggering execution of the first computer implemented method, setting the second state of the data object, and triggering execution of the second computer implemented method,
execution of the first and second computer implemented methods performed asynchronously and within a single clock cycle by either the first thread or the second thread, until the desired output data has been produced.

4. The computer-readable storage medium according to claim 1, wherein implementations of the first and second computer implemented methods are selected from a group comprising: software implementations; hardware implementations; and firmware implementations.

5. The computer-readable storage medium according to claim 4, wherein when the first computer implemented method or the second computer implemented method or both comprises a software implementation, the software implementation comprises a set of computer-executable instructions which, at runtime, instantiate one or more other executable task graphs.

6. The computer-readable storage medium according to claim 4, wherein when the first and second computer implemented methods comprise software implementations, the first task object defines an interface to a first computer program and the second task object defines an interface to a second computer program.

7. The computer-readable storage medium according to claim 1, wherein the memory represented by the data object is selected from a group comprising: persistent memory or temporary memory.

8. The computer-readable storage medium according to claim 1, wherein the computer-executable instructions are executed by multiple processors.

9. The computer-readable storage medium according to claim 1, wherein the data object has at least one owning task object from which available data is receivable, the at least one owning task object comprising the first task object, and has at least one dependent task object to which available data is suppliable, the at least one dependent task object comprising the second task object, and wherein the states of the data object are selected from a group comprising:
- a memory unavailable state, indicating that the portion of the memory is not ready to receive available data from the at least one owning task object;
- a memory available state, indicating that the portion of the memory is ready to receive available data from the at least one owning task object; and
- a data available state, indicating that available data has been received from the at least one owning task object and is ready to be supplied to the at least one dependent task object.

10. The computer-readable storage medium according to claim 9, wherein setting the first state of the data object comprises setting the memory available state, and wherein setting the second state of the data object comprises setting the data available state.

11. The computer-readable storage medium according to claim 1,
wherein the data object has at least one owning task object from which available data is receivable, the at least one owning task object comprising the first task object, and has at least one dependent task object to which available data is suppliable, the at least one dependent task object comprising the second task object,
wherein the first task object has a first task lifetime, the second task object has a second task lifetime, and the data object has a data object lifetime, the data object lifetime expiring when lifetimes of each of the owning task objects and dependent task objects have expired.

12. The computer-readable storage medium according to claim 11, wherein the method further comprises:
at runtime of the computer-executable instructions, deleting the first task object upon expiration of the first task lifetime, deleting the second task object upon expiration of the second task lifetime, and deleting the data object deleted upon expiration of the data object lifetime.

13. The computer-readable storage medium according to claim 12,
wherein the data object has a task count associated therewith, the task count comprising a total number of owning task objects and dependent task objects associated with the data object, and
wherein the method further comprises:
at runtime of the computer-executable instructions, decrementing the task count when a particular lifetime of a particular owning task object or a particular dependent task object expires, the data object lifetime expiring when the task count reaches zero.

14. The computer-readable storage medium according to claim 1, wherein the computer-executable instructions are executable by multiple processors.

15. A method for performing a process within a computing environment, the process comprising
a plurality of data processing operations,
a plurality of data dependencies, one or more data dependencies associated with each data processing operation, and a process representation formed by relating the plurality of data processing operations to the plurality of data dependencies, the method comprising:
- identifying a first thread of a plurality of threads;
- identifying a second thread of the plurality of threads;
- identifying one or more queues for storing a number of work items retrievable by the first thread or the second thread;
- instantiating an executable task graph based on the process representation, the task graph comprising
  - a plurality of task objects, each task object representing a particular computer implemented method configured to perform a corresponding particular data processing operation,
  - a plurality of data objects, each data object representing a portion of a memory allocated for storing data based on at least one data dependency associated with at least one task object, each data object having at least one owning task object from which available data is receivable, and having at least one dependent task object to which available data is suppliable, each data object having a number of states;
- setting a first state of a particular data object;
- based on the first state, storing a first work item in the one or more queues;
- storing the available data in the portion of the memory represented by the particular data object;
- after storing the available data, setting a second state of the particular data object;
- based on the second state, storing a second work item in the one or more queues;
- identifying relative priorities of the first work item and the second work item;
- based on the relative priorities, the first thread or the second thread retrieving the first work item from one of the one or more queues, the first work item, when retrieved triggering execution of the particular computer implemented method associated with the at least one owning task object of the particular data object to produce available data;
- based on the relative priorities, the first thread or the second thread retrieving the second work item from one of the one or more queues, the second work item, when retrieved, triggering execution of the particular computer implemented method associated with the at least one dependent task object of the particular data object to transform the available data to produce a desired output data, the first thread and the second thread operating asynchronously and concurrently; and
- providing the desired output data to a user of the multi-threaded computing environment.

16. The method according to claim 15, wherein the states of each data object are selected from a group comprising:
- a memory unavailable state, indicating that the portion of the memory is not ready to receive available data from the at least one owning task object;
- a memory available state, indicating that the portion of the memory is ready to receive available data from the at least one owning task object; and
- a data available state, indicating that available data has been received from the at least one owning task object and is ready to be supplied to the at least one dependent task object, and
wherein the first state of the data object comprises the memory available state, and wherein the second state of the data object comprises the data available state.

17. The method according to claim 16,
wherein the first thread and the second thread are part of a same thread group, the thread group bound to a particular processing unit, the particular processing unit configured to access a particular local memory, and
wherein the one or more queues comprises a single queue formed within the particular local memory.

18. The method according to claim 16,
wherein the first thread is part of a first thread group bound to a first processing unit configured to access a first local memory, and the second thread is part of a second thread group bound to a second processing unit configured to access a second local memory, the first and second processing units selected from a group comprising: one or more cores of a central processing unit; and one or more graphics processing units, and
wherein the one or more queues comprises a first queue formed within the first local memory and a second queue formed within the second local memory, the first local memory being the same or different than the second local memory,
wherein the step of storing the first work item in the one or more queues comprises storing linked copies of the first work item in both the first queue and the second queue, the first work item in the first queue having a different priority than the first work item in the second queue,
wherein the step of storing the second work item in the one or more queues comprises storing linked copies of the second work item in both the first queue and the second queue, the second work item in the first queue having a different priority than the second work item in the second queue, the first and second work items in both the first and second queues all having different relative priorities,
wherein based on the relative priorities, the first thread or the second thread retrieving the first work item from either the first queue or the second queue, and when the first work item is retrieved, deleting the linked copies of the first work item,
wherein based on the relative priorities, the first thread or the second thread retrieving the second work item from either the first queue or the second queue, and when the second work item is retrieved, deleting the linked copies of the second work item.

19. The method according to claim 15, further comprising:
updating the task graph after the second work item has been retrieved from one of the one or more queues and the particular computer implemented method associated with the at least one dependent task object has been executed to produce the desired output data.

20. A computing environment for performing a process, the process comprising
- a plurality of data processing operations,
- a plurality of data dependencies, one or more data dependencies associated with each data processing operation, and
- a process representation formed by relating the plurality of data processing operations to the plurality of data dependencies, the computing environment comprising:
- a plurality of processing units, each processing unit having an associated thread group, each thread group having one or more threads configured to fetch work items, each work item triggering execution of a particular computer implemented method that performs a corresponding data processing operation;

a plurality of portions of one or more computer-readable storage media, the one or more threads within a particular thread group configured to access a particular portion of the plurality of portions;

a plurality of queues, each queue formed in one or more of the plurality of portions of computer-readable storage media, each queue configured to store a plurality of work items, the plurality of work items in each queue independently and asynchronously fetchable by the one or more threads within each thread group; and a computer program executable by a plurality of processors to perform the process, the computer program performing a method comprising instantiating an executable task graph based on the process representation, the task graph comprising a plurality of task objects, each task object representing a particular computer implemented method configured to perform a corresponding particular data processing operation, and a plurality of data objects, each data object representing a portion of a memory allocated for storing data based on at least one data dependency associated with at least one task object, each data object having at least one owning task object from which available data is receivable, and having at least one dependent task object to which available data is suppliable, each data object having a number of states, setting a first state of a particular data object, based on the first state, storing a first work item in each of the plurality of queues, the first work item having a different priority identifier in each of the plurality of queues, the first work item fetched by a particular thread group based on a particular priority identifier, fetching of the first work item triggering execution of the particular computer implemented method associated with the at least one owning task object associated with the particular data object to produce available data, storing the available data in the portion of the memory represented by the particular data object, after storing the available data, setting a second state of the particular data object, and based on the second state, storing a second work item in each of the plurality of queues, the second work item having a different priority identifier in each of the plurality of queues, the second work item fetched by a particular thread group based on a particular priority identifier, fetching of the second work item triggering execution of the particular computer implemented method associated with the at least one dependent task object associated with the particular data object to transform the available data.

* * * * *